Nov. 14, 1961  G. N. HALL  3,008,217
ABRADING TOOLS
Filed Dec. 23, 1957  4 Sheets-Sheet 1
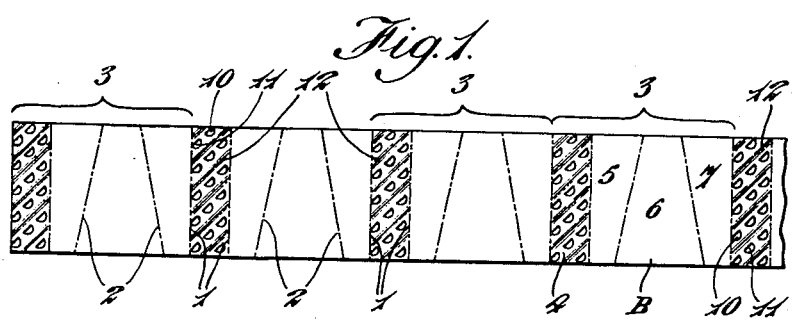
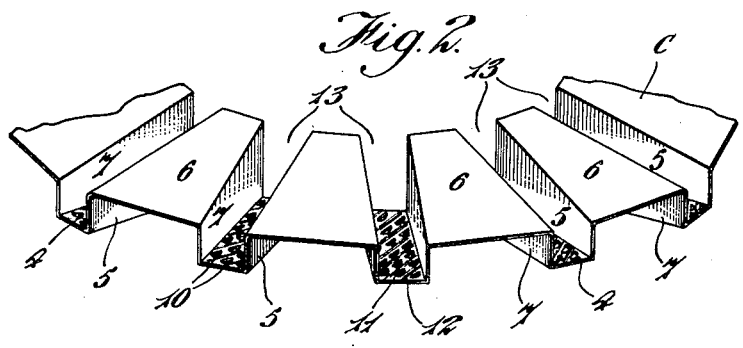
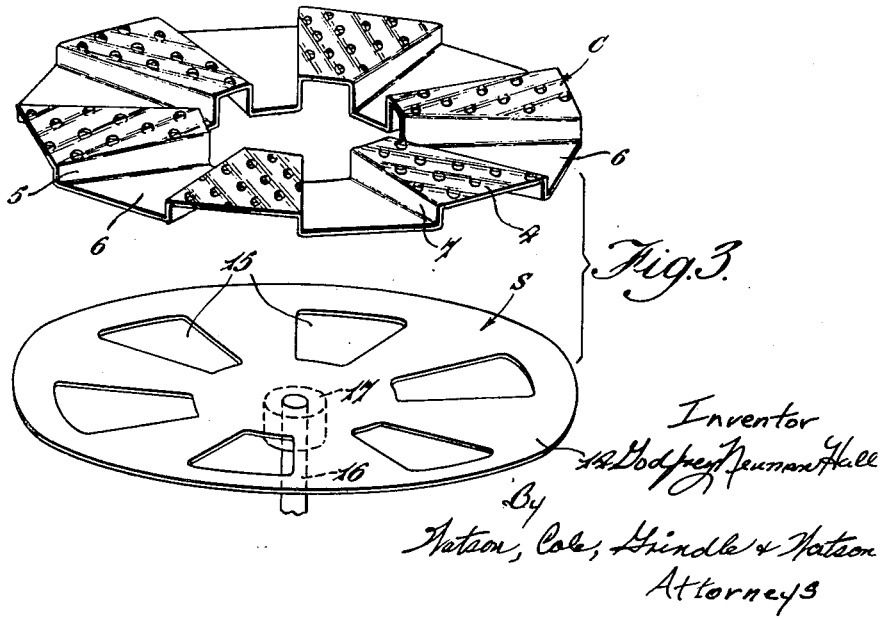

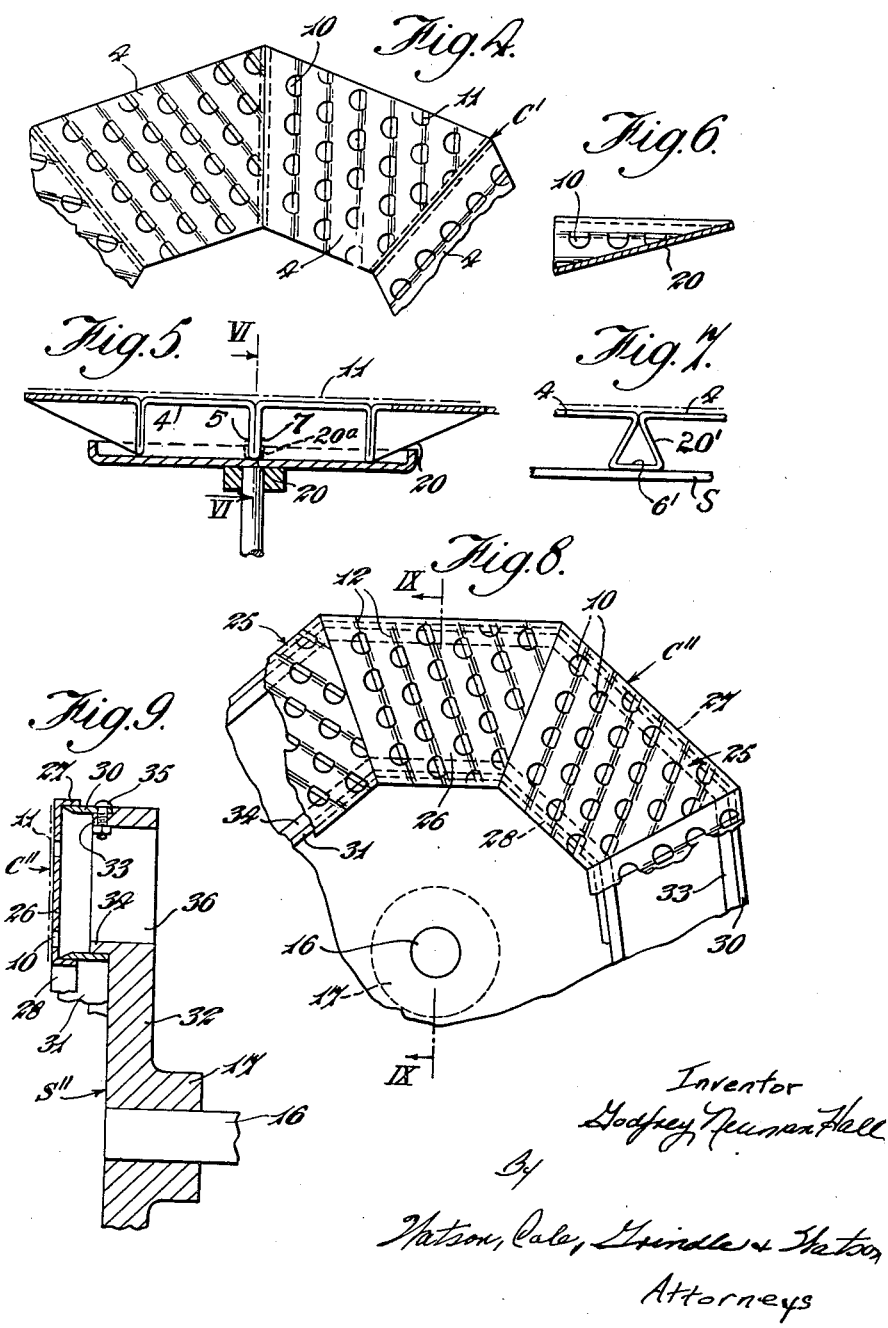

Nov. 14, 1961  G. N. HALL  3,008,217
ABRADING TOOLS
Filed Dec. 23, 1957  4 Sheets-Sheet 3
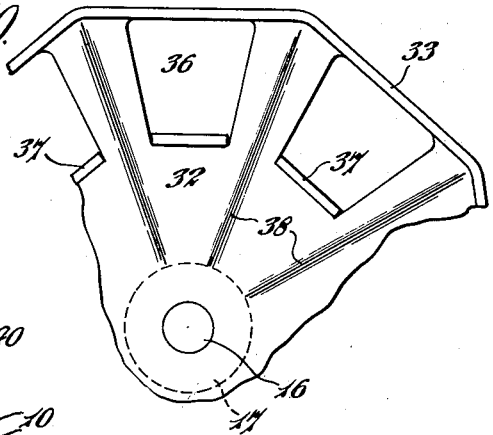
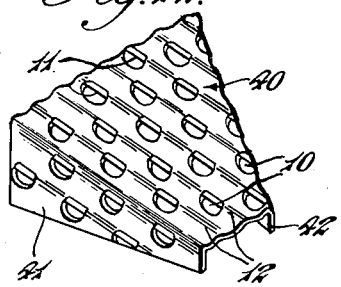
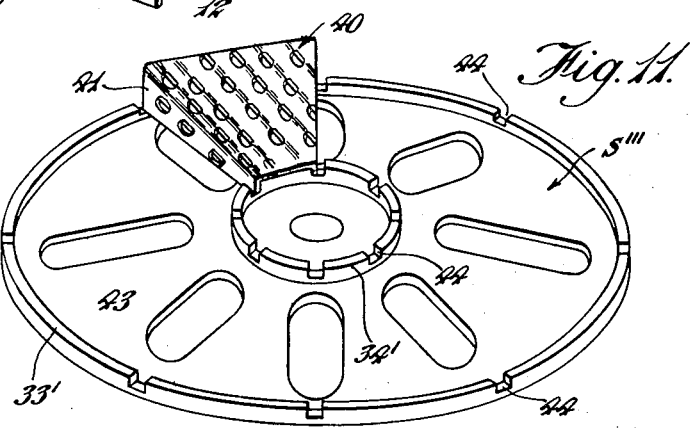
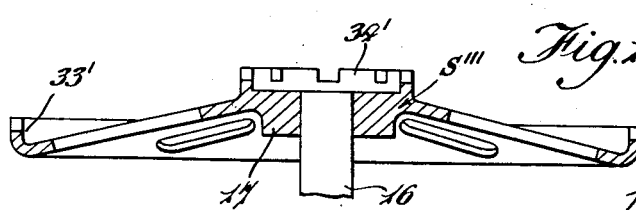

Nov. 14, 1961 G. N. HALL 3,008,217
ABRADING TOOLS
Filed Dec. 23, 1957 4 Sheets-Sheet 4
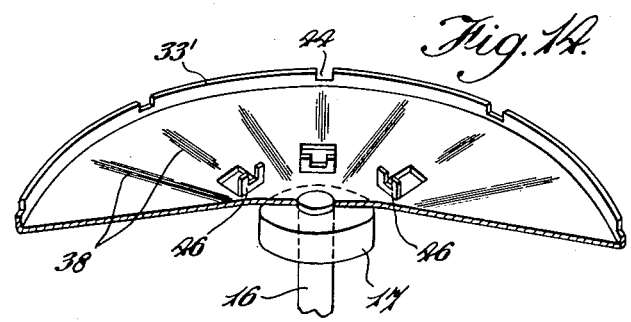
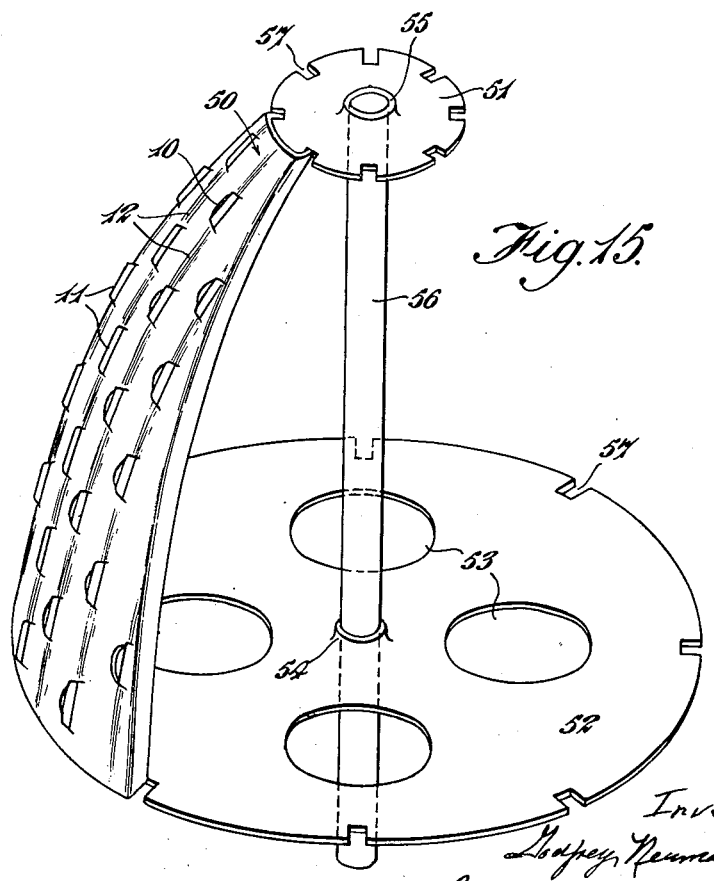

United States Patent Office 3,008,217
Patented Nov. 14, 1961

3,008,217
ABRADING TOOLS
Godfrey Newman Hall, Solihull, England, assignor to Simmonds Aerocessories Limited, Glamorganshire, Wales, a British company
Filed Dec. 23, 1957, Ser. No. 704,744
Claims priority, application Great Britain Dec. 21, 1956
1 Claim. (Cl. 29—78)

This invention relates to elements and tools, for abrading or cutting, of the kind (called hereinafter "the kind described") presenting a cutting area which is a surface of revolution and has a multiplicity of cutting edges. In use of tools of this kind they are rotated about the axis of the cutting area.

Cutting elements and tools have been proposed where the cutting area is provided by a thin flexible strip or sheet of hardenable steel or hardenable iron alloy having a multiplicity of holes formed therein and sharp cutting edges upset from the strip or sheet along a series of parallel lines each cutting edge being constituted by portions of the edge of a hole, being hard and having a clearance angle relative to the surface of the strip or sheet. Strip or sheet having these characteristics (hereinafter referred to as of "the kind described") are described in U.S. Patent No. 2,708,376 (Booth).

U.S. Patent No. 2,678,571 (Booth) describes a method of making such a cutting strip or sheet involving bending it into a series of parallel ridges the teeth extending from the crests thereof with positive rake: an advantage of a cutting element so produced is the provision of non-cutting surfaces which rub on the work and limit the depth of cut to a predetermined maximum, as is explained in U.S. Patent No. 2,769,225 (Booth).

Tools of the kind described and presenting a cylindrical cutting area can easily be made from strip or sheet such as just described by wrapping it around to form a cylinder, but where the cutting area must be flat or otherwise depart radically from the cylindrical no such simple method of manufacture is available.

The object of the invention is to provide a cutting element or tool of the kind described incorporating strip or sheet of the kind described (and being preferably also ridged as disclosed in U.S. Patent No. 2,678,571), which element or tool can easily be given a cutting area conforming to any desired surface of revolution, especially flat or conical.

With this object in view in the element or tool according to the invention, the cutting area is annular and divided on more or less radial planes into a series of cutting sections each provided by a portion of strip or sheet, the cutting edges of each said section facing so as to cut when the tool or element is rotated in one direction.

The portions of strip or sheet may be portions of a single strip folded at intervals so that said portions lie on the desired surface of revolution while intermediate adjacent parts of the strip or steel lie to the rear of said surface. Alternatively each said section may be provided by a separate portion of strip or sheet, the individual portions being assembled on a supporting member to form the complete tool.

Five preferred forms of cutting or abrading tool according to the invention, and various modifications, will now be described, by way of example only, with reference to the accompanying diagrammatic drawings, in which:

FIGURE 1 is a plan of part of a blank from which the first cutting element is formed;

FIGURE 2 is a perspective view of a part of the first cutting element;

FIGURE 3 is an exploded view of the first tool, i.e. the first element with a supporting member therefor;

FIGURE 4 is a plan of part of a second cutting element;

FIGURE 5 is an axial section of the element shown in FIGURE 4 together with a supporting member therefor;

FIGURE 6 is a sectional view taken in the line VI—VI in FIGURE 5, of a gusset produced in folding strip material to make the element of FIGURES 4 and 5; this view does not show the supporting member which appears in FIGURE 5;

FIGURE 7 is an end view of a modified form of gusset;

FIGURE 8 is a plan of part of a third form of cutting tool;

FIGURE 9 is an axial section of the part cutting tool of FIGURE 8 taken on the line IX—IX of FIGURE 8;

FIGURE 10 is a plan of a modified supporting member for use in a tool generally similar to that of FIGURES 8 and 9;

FIGURE 11 is a perspective view of part of a fourth form of cutting tool incorporating individual cutting sectors;

FIGURE 12 is a perspective view of a cutting sector such as incorporated in the FIGURE 11 tool;

FIGURE 13 is a section of the supporting member shown in FIGURE 11;

FIGURE 14 is a perspecitve view of part of a modified supporting member for use in a tool generally similar to that of FIGURE 11; and FIGURE 15 is a perspective view of part of a fifth cutting or abrading tool.

Referring to FIGURES 1 to 3 of the drawings, the blank B for the first cutting element is a long strip of hardenable steel divided into a series of transverse elements defined by transverse fold lines indicated by chain-dotted lines 1 and 2, pairs of lines 1 running perpendicular to the length of the blank being separated by pairs of lines 2 running at equal opposite angles to the blank length. Each two consecutive pairs of fold lines define a group 3 of four transverse elements 4, 5, 6, 7 of which that, 4, between the lines 1 is rectangular and the rest, 5, 6, 7 trapezoidal.

Each transverse element 4 is formed with D-shaped holes 10, cutting edges 11 all facing in the same direction and ridges 12, as described in the above-mentioned U.S. Patent No. 2,678,571, except that the hardening step is deferred until after bending the blank, which will now be described.

The blank is so bent about the fold lines 1, 2 as to produce an annular cutting element C shown in part in FIGURE 2, in which transverse elements 4 lie in a plane with the teeth facing outwardly, the elements 5 and 7 extend radially and are perpendicular to this plane, and the elements 6 lie roughly on a cone. The transverse elements 4 provide the cutting area of the element C, each one forming a section thereof and having its teeth directed so as to cut when the element is rotated in the direction of the arrow (FIGURE 3).

The cutting element C is carried on a supporting member S (FIGURE 3) providing a sheet metal disc which is dished to receive the elements 6 more or less flatly at the areas between the apertures 15, these elements 6 being spot-welded to the disc. The supporting member S also provides means by which it can be rotated e.g. by a portable electric motor: this means may take the form of a stub shaft 16 capable of being grasped by a drill chuck and projecting from a boss 17 brazed or welded to the disc 14. Rotation will of course be coaxial with the cutting element C so that the elements 4 act as a continuous abrading annulus.

In use of the tool illustrated in FIGURE 3 chips cut by the teeth will pass through the holes into the channels 13 defined by the elements 4, 5 and 7; the chips pass radially out of the channels due to centrifugal force, and may also pass rearwardly through the apertures 15 in the disc 14.

It will be appreciated that the teeth may be formed on the elements 6 rather than on the element 4, so that the cutting element has a conical abrading face; the supporting disc 14 will then be flat and spot-welded to the elements 4.

The cutting element C is preferably made of mild steel, and the cutting edges 11 are hardened by a cyanide or gaseous diffusion treatment of the whole element after it has been bent to shape, as has been mentioned. The use of a soft material like mild steel enables the element C to be given curvature in planes at right angles so as to make the elements 4 conform to a part-spherical or other surface of revolution having a curved generator.

Cutting edges 11 and ridges 12 may be formed without interruption on the blank B, instead of only at the elements 4.

It will be clear from a consideration of FIGURES 1 to 3 that generally speaking it will be desirable to have the transverse elements 4 (which carry the cutting edges 11) as wide as possible (in the circumferential direction) at the expense of the width of the transverse elements 6, which only serve to be spot-welded to the supporting member S. The elements 6 will however normally have to be wide enough to accommodate a spot-welding electrode. Some interruption of the cutting area will not be important for some work, e.g. abrading a floor. On the other hand for abrading small articles an interrupted cutting area would be useless.

The second cutting element C' (FIGURES 4 to 6) presents an uninterrupted cutting surface; it is in fact similar to the first element C but without the transverse elements 6. The transverse elements 4 again carry cutting edges 11 (these are in fact formed continuously along the element), and one fold line for each group of transverse elements coincides with a ridge 12. The transverse elements 5, 7 contact each other flatly because the ridges 12 and raised edges 11 will be pressed flat when the strip is crimped to form the gusset 20. The element C' can be secured to a supporting member generally similar to that of FIGURE 3 but with turned-up radial tongues to abut and be secured to the gussets 20.

Alternatively the element C' could, as is shown in FIGURE 5, be secured to a supporting member S' generally resembling that of FIGURE 14, the gussets 20 being located in notches 20a similar to the notches 44 of FIGURE 14 and being welded there. Yet another method of securing the cutting element C' to a supporting member is shown in FIGURE 7: here the gusset 20 seen in FIGURES 5 and 6 is modified to be triangular in section on a radius, with the result that a small element 6' appears, somewhat like the transverse element 6 of FIGURES 1 to 3, but completely concealed behind the continuous cutting area presented by the elements 4. This element 6' enables the cutting element C' to be spot-welded to a support such as the support S of FIGURE 3, provided special spot-welding equipment is used having an electrode capable of moving into the gusset 20' at an angle. The support is indicated at S and is shown broken away.

The third form of cutting or abrading tool, seen in FIGURES 8 and 9, is made up, not of a single strip (such as the blank B) bent into an annulus, but of a series of similar individual sectors designated generally 25: each sector consists of a trapezoidal portion 26 from which are bent down two straight edge portions 27, 28. The portion 26 has holes 10, cutting edges 11 and ridges 12 as have been described above and the sectors are advantageously made by shearing off parts of a strip of indefinite length already formed with holes, cutting edges and ridges over a width equal to that of the portion 26. After this shearing and the bending down of the edge portions 27, 28 the sector is surface-hardened. The sectors 25 are assembled over a pair of polygonal rings 30, 31, whose edges abut the rear of the portion 26 and which lie against the inside of the edge portions 27, 28 respectively of the various sectors: the edge portions and rings are spot-welded to form a unitary cutting element C''. The supporting member S'' for the cutting element comprises a disc 32 having a boss 17 and stub shaft 16 as above described and also a pair of circumferential polygonal flanges 33, 34 upstanding from the front face of the disc over which the rings 30, 31 are engaged and to which they are secured by bolts 35 or other suitable means. Between the flanges 33, 34 the disc 32 is apertured at 36 for the rearward escape of swarf. For clarity, the apertures are not shown in FIGURE 8.

As will be seen, the cutting area of the element C'' is divided on radial planes into sections each provided by a sector portion 26. It will be evident that by varying the width of the edge portions 27, 28 and rings 30, 31 the cutting area can be made conical. The disc 32 is illustrated as a turned casting but could be made of sheet metal by replacing the continuous flange 34 by a series of spaced tongues 37 as illustrated in FIGURE 10: strengthening ribs are shown at 38. With the FIGURE 10 supporting member the rings 30, 31 are eliminated and the sectors 25 fixed directly to the flange 33 and tongues 37.

The fourth cutting or abrading tool (FIGURES 11 to 13) also comprises sectors, here designated 40: these differ from the sectors 25 only by the replacement of the side edge portions 27, 28 by turned down end edge portions 41, 42 which lie on radial planes in the finished tool: the depth of the edge portions 41, 42 is greater away from the axis of the tool than nearer to it. The supporting member S''' is a machined casting 43 of general conical shape having a boss 17, stub shaft 16 and apertures 36 as in the member S''. The member has also two circumferential flanges 33', 34' like the flanges 33, 34 of the member S'' except that they are circular and have radially aligned notches 44. In assembly of the tool the edge portions 41, 42 are inserted in the notches 44, two such portions in each notch, and are brazed or welded in position. Swarf escapes not only rearwardly but also radially outwards, the discharge area increasing towards the outer edge of the tool.

The supporting member S''' may be modified as shown in FIGURE 14, so that it can be made of sheet metal. Here the flange 34' of FIGURE 11 is replaced by spaced notched tongues 46: as in FIGURE 10, strengthening ribs 38 are provided.

FIGURE 15 shows one way in which the tool of FIGURES 11 to 14 can be modified to produce a relatively small-diameter rounded tool of the burr type. The sectors, here designated 50 (only one being shown), are given a double curvature: the supporting member consists of a pair of discs 51, 52 of sheet metal apertured at 53 and having flanges 54, 55 receiving a shaft 56 and being welded thereto. The discs have notches 57 aligned in radial planes which receive the end edge portions of the sectors.

The cutting or abrading elements or tools described above can be modified in various ways, and features described in connection with one form of tool will often be capable of incorporation in another form. In particular most of the tools have flat cutting areas; the tools could however easily be modified to have conical or part-spherical cutting surfaces. Tools of the kind made up of individual sectors may be made with discontinuous cutting areas. A tool such as shown in FIGURE 15 may be made with a cutting element on the lines of that of FIGURES 4 and 5, the gussets 20 being received in the notches 57. In most of the tools shown the radial width of the annular cutting area can be increased so that the inner radius is quite small. At the cost of some discontinuity in the cutting area, the cutting sector of FIGURE 12 can be made with parallel end edges the portions 41, 42 being bent on fold lines parallel to the ridges. Normally, with a mild steel strip or sheet there should be no great difficulty in bending across the ridges.

The cutting area may be made to extend up to the edge of the strip or sheet portions which provide that area. Often the most satisfactory way of accomplishing this, e.g. in the sectors 40, 50 or the element C', will be to make the circumferential edges of the sector or element intersect cutting edges 11 so that there is no non-cutting margin.

I claim:

A cutting tool presenting an annular cutting area which is a surface of revolution and is divided into a series of cutting sections; the tool comprising a series of portions of thin flexible cutting sheet of hardenable material formed with a multiplicity of holes in parallel lines, a series of ridges each adjacent to and parallel to one line of holes, and a multiplicity of similarly directed cutting edges each being constituted by a sharpened edge of a hole projecting beyond the adjacent ridge, said cutting edges being hard and having a clearance angle relative to the general plane of the adjacent surface of the sheet, each sheet portion providing one of said cutting sections; and support means for locating said cutting sections for cutting by said cutting edges when the tool is rotated about its axis in one direction, said support means providing for egress from the cutting area of swarf cut by said edges and discharged through the respective holes and said support means giving support to each cutting section only at edge portions thereof, the ridges running transverse to at least one edge portion to give substantial rigidity to the unsupported area of each said section, said support means providing means for rotation of the tool about its axis, said sheet portions being portions of a single strip folded at intervals along its length on transverse fold lines which define a series of similar groups of transverse elements and each group comprises three transverse elements which include the following, taken in turn: said element providing a section of the cutting area, and second and third elements crimped together to form a gusset extending rearwardly of the cutting area, the third element joining the first element of the next group, and said first elements providing a substantially continuous annular cutting area, the support means comprising said gusset and a disc to which the gusset is secured and which carries the rotation means.

References Cited in the file of this patent

UNITED STATES PATENTS

| | | |
|---|---|---|
| 1,656,291 | Passefiume | Jan. 17, 1928 |
| 2,216,747 | Klimek | Oct. 8, 1940 |
| 2,477,198 | Murray | July 26, 1949 |
| 2,703,119 | Pullen | Mar. 1, 1955 |
| 2,769,225 | Booth | Nov. 6, 1956 |
| 2,793,666 | Scheiner | May 28, 1957 |
| 2,842,904 | Ralys | June 15, 1958 |

FOREIGN PATENTS

| | | |
|---|---|---|
| 515,216 | France | Nov. 22, 1920 |
| 850,660 | France | Sept. 18, 1939 |
| 368,563 | Germany | Feb. 6, 1923 |
| 8,454 | Great Britain | Apr. 7, 1910 |
| 419,252 | Great Britain | Nov. 8, 1934 |